United States Patent Office 3,389,976
Patented June 25, 1968

3,389,976
PROCESS FOR PREPARING MIXED NITROGEN TRIHALIDES SUCH AS DICHLOROFLUOROAMINE
Vytautas Grakauskas, Arcadia, Calif., assignor to Aerojet-General Corporation, Azusa, Calif., a corporation of Ohio
No Drawing. Filed Oct. 14, 1964, Ser. No. 404,208
8 Claims. (Cl. 23—356)

This invention relates to novel N-bromo and N-chloro-N-fluorocarbamates, their method of preparation, and their use as intermediates in the preparation of the mixed nitrogen trihalides.

It is an object of this invention to prepare novel N-bromo- and N-chloro-N-fluorocarbamates. It is another object of this invention to prepare these compounds by a novel process from salts of organic N-fluorocarbamates. Still another object of this invention is to employ the novel N-bromo- and N-chloro-N-fluorocarbamates as starting materials for the preparation of mixed nitrogen trihalides. These and other objects of this invention will be apparent from the detailed description which follows.

The N-bromo- and N-chloro-N-fluorocarbamates of my invention have the following general formula:

(I)

wherein X is selected from the group consisting of chlorine and bromine, and R is a monovalent organic radical selected from the group consisting of alkyl, cycloalkyl, haloalkyl and nitroalkyl. Preferably, R is a lower member of the series and contains from 1 to about 10 carbon atoms.

Typical R groups include methyl, ethyl, isopropyl, butyl, octyl, decyl, cyclopentyl, cyclohexyl, 2-chloroethyl-3-bromopentyl, 2,2-dinitropropyl and 3,5-dinitropentyl.

The novel N-bromo- and N-chloro-N-fluorocarbamates are prepared by the halogenation of organic N-fluorocarbamates or salts thereof in accordance with the following general equation:

(II)
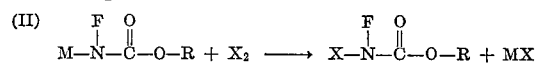

wherein R and X are as defined above, and M is hydrogen or an alkali or alkaline earth metal such as sodium, lithium, potassium, calcium or barium.

In Reaction II, it is preferred that the N-fluorocarbamate starting material be in the form of the alkali or alkaline earth metal salt since it has been found that the use of the salt substantially increases the rate of halogenation. The salt is readily obtained by treating the N-fluorocarbamate at about 0° C. to 20° C. with a stoichiometric amount of the alkali or alkaline earth metal hydroxide.

Illustrative of the N-fluorocarbamate starting materials which may be utilized in Reaction II are ethyl N-fluorocarbamate, isopropyl N-fluorocarbamate, butyl N-fluorocarbamate, cyclohexyl N-fluorocarbamate, 2-chloropropyl N-fluorocarbamate, phenyl N-fluorocarbamate, tolyl N-fluorocarbamate, benzyl N-fluorocarbamate, and 2-nitropropyl N-fluorocarbamate.

The reaction is preferably conducted in the presence of a solvent for the N-fluorocarbamate starting material. Especially preferred as a solvent is water. Another suitable class of solvents are the alkanols such as methanol and ethanol. Alternatively, the N-fluorocarbamate starting material may be suspended in any solvent inert to chlorine and bromine. In this way, the reaction may be carried out in chloroform or carbon tetrachloride. In general, the reaction medium for the preparation of N-bromo- and N-chloro-N-fluorocarbamates initially will be slightly basic because of the presence of the N-fluorocarbamate salt. Upon the introduction of a stoichiometric amount of chlorine or bromine, the medium will become neutral. Thus, it can be seen that while the amount of chlorine or bromine used in the halogenation reaction is not critical, the most efficient use of the reactants and optium control of the reaction is attained when the halogen is used in about a stoichiometric amount based on the amount of organic N-fluorocarbamate or organic N-fluorocarbamate salt present.

The halogenation reaction of this invention preferably is conducted at relatively low temperatures of from about −20° C. to +35° C. and more preferably at from about −10° C. to about +10° C. The use of elevated temperatures during halogenation should be avoided since the N-fluorocarbamate reactants become unstable upon heating.

The N-fluorocarbamate reactants employed in this invention may be obtained in the manner described in assignee's copending United States application Ser. No. 404,210, filed Oct. 14, 1964, the disclosure of which is expressly incorporated herein by reference.

The N-bromo- and N-chloro-N-fluorocarbamates of Formula I may be converted to mixed nitrogen trihalides in accordance with the following general reaction equation:

(III)
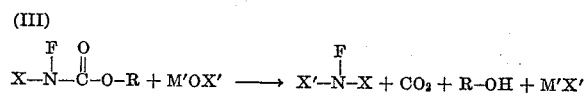

wherein X and R are as defined above, X' is selected from the group consisting of chlorine and bromine and M' is an alkali metal, preferably sodium or potassium. The alkali hypohalite (M'OX') may be prepared in situ by adding an alkali metal hydroxide to the N-halo-N-fluorocarbamate, and then introducing chlorine or bromine.

As can be seen the starting material in Reaction III can be a N-bromo- or N-chloro-N-fluorocarbamate. Either of these starting materials reacts readily with the alkali hypohalite to yield a nitrogen trihalide. The composition of the product is determined by the nature of the organic starting material and the type of hypohalite employed. For example, dichlorofluoramine is obtained by reacting ethyl N-chloro-N-fluorocarbamate with sodium hypochlorite in accordance with the following equation:

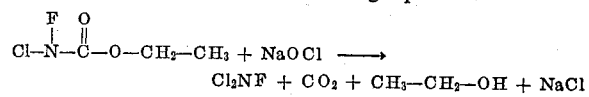

On the other hand, bromochlorofluoramine is prepared by either one of the following reactions:

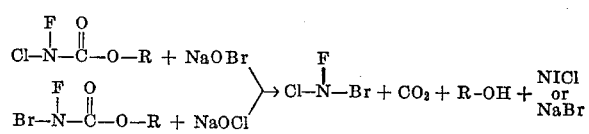

These mixed nitrogen trihalides are difficult to synthesize by any other technique heretofore known. These compounds find many uses as strong oxidizing agents, and are also valuable starting materials for the preparation of other compounds containing the N–F linkage. For example, dichlorofluoramine can be decomposed to give chlorodifluoramine.

It should also be understood that the N-bromo- or N-chloro-N-fluorocarbamates starting materials of Reaction III may be formed in situ from the corresponding N-fluorocarbamate or salt thereof with the hypohalite salt providing the necessary halogen. Thus, ethyl N-fluorocarbamate may be reacted with sodium hypochlorite to form dichlorofluoramine in accordance with the following equation:

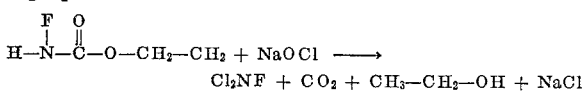

In the presence of the hypohalite, this reaction does not stop at the N-chloro-N-fluorocarbamate intermediate since, as is indicated above, these compounds are unstable in basic solution.

The mixed nitrogen trihalides are most conveniently prepared in an aqueous solution, however, the reaction may also be conveniently carried out in other substantially inert solvents such as the alkanols. The reaction temperature is normally maintained between about $-20°$ C. and $+30°$ C. In Reaction III, the reactants are employed in about stoichiometric amounts. However, proportions are not critical and the relative amounts of the two reactants may be varied over a wide range.

The novel N-bromo- or N-chloro-N-fluorocarbamates and the mixed nitrogen trihalides obtainable in accordance to the practice of this invention may be isolated in the conventional manner employing procedures familiar to those skilled in the art. For example, the N-bromo- and N-fluorocarbamates may be conveniently recovered from the reaction medium by extraction. The mixed nitrogen trihalides are readily recovered by collecting the volatile material evolved during the course of the reaction in a cold trap maintained at a temperature in the order of $-60°$ C. to $-100°$ C. The products of this invention may be purified by distillation and/or crystallization.

The examples which follow are illustrative only, and should not be regarded as limiting the invention in any way. In the examples, the parts and percentages are by weight unless otherwise indicated.

Example I.—Preparation of ethyl N-chloro-N-fluorocarbamate

Reaction was carried out in a 100-ml. three-necked round-bottomed flask equipped with a stirrer and gas inlet and outlet tubes. Sodium salt of ethyl N-fluorocarbamate was prepared by dissolving 4.3 grams ethyl N-fluorocarbamate (0.04 mole) in a solution of 1.6 grams sodium hydroxide (0.04 mole) in 25 ml. of water at 0 to 5° C. The solution, together with 25 ml. methylene chloride, was placed into the reaction flask. Into the cold (0 to 5° C.) vigorously stirred mixture was passed chlorine gas (commercial chlorine was condensed at $-80°$ C. until 1.82 ml. of liquid was collected; this amount of liquid chlorine (0.04 mole) was allowed to evaporate and was passed into the reaction mixture by means of the gas inlet tube) over a period of 45 to 60 minutes. At the end of the run the phases were separated and the aqueous solution was extracted with two 25-ml. portions of methylene chloride. The methylene chloride solution and extracts were combined, dried over Drierite, and filtered. The filtrate was concentrated and the pale yellow liquid residue was distilled to give 3.2 grams of a colorless liquid, B.P. 45° C./60 to 70 mm., $n_D^{25}$ 1.4015, which was identified as ethyl N-chloro-N-fluorocarbamate.

Analysis.—Calcd. for $C_3H_5ClFNO_2$: C, 25.46; H, 3.56; N, 9.90; F, 13.42. Found: C, 26.00; H, 3.50; N, 9.76; F, 12.60.

Example II.—Preparation of 2-nitroethyl N-chloro-N-fluorocarbamate

Sodium salt of 2-nitroethyl N-fluorocarbamate (0.04 mole) is dissolved in about 25 ml. of water and added to a 100 ml. flask equipped with a stirrer and gas inlet and outlet tubes. Then 25 ml. of methylene chloride are added to the reaction flask. Into the cold (0 to 5° C.) stirred mixture is passed chlorine gas (0.04 mole) over a period of 45 to 60 minutes. At the end of the run the phases are separated and the aqueous solution is extracted with methylene chloride. The methylene chloride solution and extracts are combined, dried, and filtered. The filtrate is concentrated and the residue obtained is identified as 2-nitroethyl N-chloro-N-fluorocarbamate by elemental analysis.

Example III.—Preparation of butyl N-chloro-N-fluorocarbamate

The reaction is carried out in a 100-ml. three-necked round-bottomed flask equipped with a stirrer and gas inlet and outlet tubes. Sodium salt of butyl N-fluorocarbamate (0.04 mole) is dissolved in 25 ml. water. Then, 25 ml. methylene chloride and the aqueous solution are placed into the reaction flask. Into the cold (0 to 5° C.) vigorously stirred mixture is passed chlorine gas (0.04 mole) over a period of about 60 minutes. At the end of the run the phases are separated and the aqueous solution is extracted with two portions of methylene chloride. The methylene chloride solution and extracts are combined, dried, and filtered. The filtrate is concentrated and the liquid residue is distilled and identified as butyl N-chloro-N-fluorocarbamate by elemental analysis.

Example IV.—Preparation of 2,2-dichloropropyl N-chloro-N-fluorocarbamate

The preparation is conducted in a flask equipped with a stirrer and gas inlet and outlet tubes. Potassium salt of 2,2-dichloropropyl N-fluorocarbamate (0.02 mole) is dissolved in 50 ml. of water. This solution is added to the flask. Then 50 ml. methylene chloride are placed in the reaction flask. Into the cold (0 to 5° C.) vigorously stirred mixture is passed chlorine gas (0.02 mole) over a period of about one hour. At the end of the run the phases are separated and the aqueous solution is extracted with methylene chloride. The methylene chloride solution and extracts are combined, dried and filtered. The filtrate is concentrated and the residue is identified as 2,2-dichloropropyl N-chloro-N-fluorocarbamate.

Example V.—Preparation of ethyl N-bromo-N-fluorocarbamate

To a mixture of 0.04 mole of sodium salt of ethyl N-fluorocarbamate in 15 ml. water and 50 ml. carbon tetrachloride was added dropwise with vigorous stirring, at 0 to 5° C., elementary bromine until the bromine color became persistent. The reaction was completed in 10 minutes. At the end of the run the phases were separated and the aqueous phase was extracted with two 30-ml. portions of carbon tetrachloride. The carbon tetrachloride solution and extracts were combined, dried and filtered. The orange-yellow clear filtrate was concentrated to remove the solvent and the orange-red liquid residue was distilled to give 6.0 grams of an orange-yellow liquid, B.P. 30° C./0.1 to 0.3 mm., $n_D^{25}$ 1.4421. This material was identified as ethyl N-bromo-N-fluorocarbamate.

Analysis.—Calcd. for $C_3H_5BrFNO_2$: C, 19.36; H, 2.71; Br, 43.0; F, 10.20. Found: C, 20.00; H, 2.43; Br, 45.0; F, 10.70.

Example VI.—Preparation of butyl N-bromo-N-fluorocarbamate

To a mixture of 0.04 mole of butyl N-fluorocarbamate in 15 ml. water and 50 ml. carbon tetrachloride is added dropwise with vigorous stirring, at 0 to 5° C., elementary bromine until the bromine color became persistent. The reaction is completed in about 10 minutes. At the end of the run the phases are separated and the aqueous phase is extracted with two 30-ml. portions of carbon tetrachloride. The carbon tetrachloride solution and extracts are combined, dried and filtered. The filtrate is concentrated to remove the solvent and the residue is distilled to give about 6.0 grams of a product which is identified as butyl N-bromo-N-fluorocarbamate by elemental analysis.

Example VII.—Preparation of cyclohexyl N-bromo-N-fluorocarbamate

To a mixture of 0.04 mole of calcium salt of cyclohexyl

N-fluorocarbamate in 15 ml. water and 50 ml. carbon tetrachloride is added dropwise with vigorous stirring, at 0 to 5° C., elementary bromine until the bromine color became persistent. The reaction is completed in 10 minutes. At the end of the run the phases are separated and the aqueous phase is extracted with portions of carbon tetrachloride. The carbon tetrachloride solution and extracts are combined, dried and filtered. The filtrate is concentrated to remove the solvent and the residue is distilled to give a good yield of material identified as cyclohexyl N-bromo-N-fluorocarbamate.

Example VIII.—Preparation of dichlorofluoramine from ethyl N-fluorocarbamate

To 150 ml. sodium hypochlorite ("Clorox"—commercial 5.3 percent aqueous sodium hypochlorite) in a 250-ml. three-necked round-bottomed flask equipped with a stirrer, dropping funnel and gas outlet tube was added at 0 to 5° C. over a period of 20 to 25 minutes, 5.4 grams ethyl N-fluorocarbamate (0.05 mole). The reactor was connected in series with a —80° C. trap to condense volatile materials escaping from the reaction flask during the course of the reaction. At the end of the run there were 0.3 ml. of a yellow liquid in the —80° C. trap and larger amounts of the same material on the bottom of the reaction flask. When the reaction mixture was warmed up to 25° C., the yellow liquid distilled from the reactor into the —80° C. trap and amounted to 1.8 ml. The crude material, containing some carbon dioxide, was purified by a trap-to-trap distillation. The infrared spectrum of the material showed two very strong absorption peaks at 12.0 and 12.2μ. The material decomposes slowly in the gas phase with the formation of difluoro diazine and chlorine. On the basis of its infrared spectrum and its physical properties the compound was identified as dichlorofluoramine. The above properties of the product also conformed to those described for dichlorofluoramine in the literature.

Example IX.—Preparation of dichlorofluoramine from octyl N-fluorocarbamate

To 150 ml. sodium hypochlorite ("Clorox"—commercial 5.3 percent aqueous sodium hypochlorite) in a 250-ml., three-necked, round-bottomed flask equipped with a stirrer, dropping funnel and gas outlet tube is added at 0 to 5° C. over a period of 20 to 25 minutes, 5.4 grams octyl N-fluorocarbamate (0.05 mole). The reactor is connected in series with a —80° C. trap to condense volatile materials escaping from the reaction flask during the course of the reaction. At the end of the run there are 0.3 ml. of a yellow liquid in the —80° C. trap and larger amounts of the same material on the bottom of the reaction flask. When the reaction mixture is warmed up to 25° C., the yellow liquid distilled from the reactor into the —80° C. trap and amounted to 1.8 ml. The crude material, containing some carbon dioxide, is purified by a trap-to-trap distillation. The infrared spectrum of the material showed two very strong absorption peaks at 12.0 and 12.2μ. On the basis of its infrared spectrum and its physical properties the compound is identified as dichlorofluoramine.

Example X.—Preparation of dichlorofluoramine from ethyl N-chloro-N-fluorocarbamate With stirring, 0.7 gram of ethyl N-chloro-N-fluorocarbamate was added dropwise over a period of five minutes, to 20 ml. of 5.3 percent aqueous sodium hypochlorite. At the end of the run the reaction mixture was warmed up to 25 to 30° C. and 0.25 ml. of a yellow liquid accumulated gradually in a —80° C. trap connected in series with the reactor. The infrared spectrum of the product was found to be identical in all respects with that of the product obtained from ethyl N-fluorocarbamate and sodium hypochlorite.

Example XI.—Preparation of dichlorofluoramine from butyl N-chloro-N-fluorocarbamate With stirring, 0.7 grams of butyl N-chloro-N-fluorocarbamate was added dropwise over a period of five minutes, to 20 ml. of 5.3 percent aqueous sodium hypochlorite. At the end of the run the reaction mixture was warmed up to 25 to 30° C. and 0.25 ml. of a yellow liquid accumulated gradually in a —80° C. trap connected in series with the reactor. The infrared spectrum of the product showed it to be dichlorofluoramine.

Having fully described the invention, it is intended that it be limited only by the lawful scope of the appended claims.

I claim:

1. The method of preparing mixed nitrogen trihalides of the formula:

which comprises reacting an N-halo-N-fluorocarbamate of the formula:

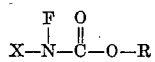

with an alkali metal hypohalite, wherein in the above formulae, X and X' may be the same or different, and are selected from the group consisting of chlorine and bromine, and R is a monovalent organic radical selected from the group consisting of alkyl, cycloalkyl, haloalkyl and nitroalkyl.

2. The method of preparing mixed nitrogen trihalides of the formula:

which comprises reacting in aqueous media an N-halo-N-fluorocarbamate of the formula:

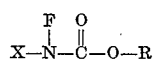

with an alkali metal hypohalite, wherein in the above formulae, X and X' may be the same or different, and are selected from the group consisting of chlorine and bromine, and R is a monovalent organic radical selected from the group consisting of alkyl, cycloalkyl, haloalkyl and nitroalkyl.

3. The method of preparing mixed nitrogen trihalides of the formula:

which comprises reacting an N-chloro-N-fluorocarbamate of the formula:

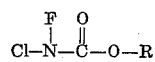

with an alkali metal hypohalite, wherein in the above formulae, X' is selected from the group consisting of chlorine and bromine, and R is a monovalent organic radical selected from the group consisting of alkyl, cycloalkyl, haloalkyl and nitroalkyl.

4. The method of preparing mixed nitrogen trihalides of the formula:

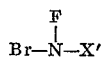

which comprises reacting an N-bromo-N-fluorocarbamate of the formula:

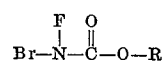

with an alkali metal hypohalite, wherein in the above formulae, X' is selected from the group consisting of chlorine and bromine, and R is a monovalent organic radical selected from the group consisting of alkyl, cycloalkyl, haloalkyl and nitroalkyl.

5. The method of preparing dichlorofluoramine which comprises reacting sodium hypochlorite with ethyl N-chloro-N-fluorocarbamate.

6. The method of preparing mixed nitrogen trihalides of the formula:

which comprises reacting a compound of the formula:

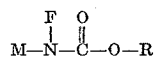

with an alkali metal hypohalite, wherein in the above formulae, X and X' may be the same or different, and are selected from the group consisting of chlorine and bromine, and R is a monovalent organic radical selected from the group consisting of alkyl, cycloalkyl, haloalkyl and nitroalkyl, and M is selected from the group consisting of hydrogen, the alkali metals and the alkaline earth metals.

7. The method of preparing dichlorofluoramine which comprises reacting a compound of the formula:

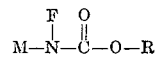

with an alkali metal hypochlorite, wherein in the above formula, R is a monovalent organic radical selected from the group consisting of alkyl, cycloalkyl, haloalkyl and nitroalkyl, and M is selected from the group consisting of hydrogen, the alkali metals and the alkaline earth metals.

8. The method of preparing dichlorofluoramine which comprises reacting ethyl N-fluorocarbamate with sodium hypochlorite.

References Cited

UNITED STATES PATENTS

| | | | |
|---|---|---|---|
| 2,963,468 | 12/1960 | Cleaver | 260—87.5 |
| 3,166,595 | 1/1965 | Frazer | 260—583 |
| 3,077,377 | 2/1963 | Lawton et al. | 23—14 |

OTHER REFERENCES

Hoffman et al., Chemical Reviews, vol. 62, 1962, pp. 1 to 4.

Chemical Abstract, vol. 52, p. 11115 (1958).

MILTON WEISSMAN, *Primary Examiner.*

REUBEN EPSTEIN, BENJAMIN R. PADGETT,
*Examiners.*

L. A. SEBASTIAN, *Assistant Examiner.*